(12) United States Patent
Fushiki et al.

(10) Patent No.: US 9,475,484 B2
(45) Date of Patent: Oct. 25, 2016

(54) ENGINE ROTATION CONTROL SYSTEM

(71) Applicant: HITACHI CONSTRUCTION MACHINERY CO., LTD., Tokyo (JP)

(72) Inventors: Michio Fushiki, Tsuchiura (JP); Naokazu Oda, Tsuchiura (JP); Katsuhiko Shimizu, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/767,436

(22) PCT Filed: Mar. 24, 2014

(86) PCT No.: PCT/JP2014/058136
§ 371 (c)(1),
(2) Date: Aug. 12, 2015

(87) PCT Pub. No.: WO2014/157114
PCT Pub. Date: Oct. 2, 2014

(65) Prior Publication Data
US 2016/0121873 A1  May 5, 2016

(30) Foreign Application Priority Data
Mar. 29, 2013 (JP) ................. 2013-074525

(51) Int. Cl.
| B60W 20/10 | (2016.01) |
| B60W 20/00 | (2016.01) |
| B60K 6/46 | (2007.10) |
| B60W 10/06 | (2006.01) |
| B60W 30/18 | (2012.01) |
| F02D 41/02 | (2006.01) |
| F02D 41/08 | (2006.01) |
| F02D 31/00 | (2006.01) |
| B60L 3/10 | (2006.01) |
| B60L 7/06 | (2006.01) |
| B60L 11/12 | (2006.01) |
| B60L 15/20 | (2006.01) |
| B60W 10/08 | (2006.01) |
| F02D 29/06 | (2006.01) |
| F02D 41/10 | (2006.01) |

(52) U.S. Cl.
CPC ................ *B60W 20/10* (2013.01); *B60K 6/46* (2013.01); *B60L 3/106* (2013.01); *B60L 7/06* (2013.01); *B60L 11/123* (2013.01); *B60L 15/2072* (2013.01); *B60W 10/06* (2013.01); *B60W 10/08* (2013.01); *B60W 20/00* (2013.01); *B60W 30/18027* (2013.01); *F02D 29/06* (2013.01); *F02D 31/001* (2013.01); *F02D 41/021* (2013.01); *F02D 41/0225* (2013.01); *F02D 41/08* (2013.01); *F02D 41/107* (2013.01); *B60L 2200/36* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/465* (2013.01); *B60L 2240/647* (2013.01); *B60L 2240/80* (2013.01); *B60L 2250/24* (2013.01); *B60L 2250/26* (2013.01); *B60W 2510/0638* (2013.01); *B60W 2510/1005* (2013.01); *B60W 2520/04* (2013.01); *B60W 2540/10* (2013.01); *B60W 2540/12* (2013.01); *B60W 2540/16* (2013.01); *B60W 2710/0644* (2013.01); *B60W 2710/081* (2013.01); *B60W 2710/083* (2013.01); *F02D 2200/602* (2013.01); *Y02T 10/6217* (2013.01); *Y02T 10/645* (2013.01); *Y02T 10/7077* (2013.01); *Y02T 10/7241* (2013.01); *Y02T 10/7275* (2013.01); *Y02T 10/7291* (2013.01); *Y02T 90/16* (2013.01); *Y10S 903/93* (2013.01)

(58) Field of Classification Search
CPC ....... B60K 6/46; B60W 10/06; B60W 10/08; B60W 20/00; B60W 20/10; B60W 30/18027; B60W 2510/0638; B60W 2510/1005; B60W 2540/10; B60W 2540/12; B60W 2540/16; B60W 2710/0644; B60W 2710/081; B60W 2710/083; B60W 2520/04; B60L 3/106; B60L 7/06; B60L 11/123; B60L 15/2072;

B60L 2210/40; B60L 2200/36; B60L 2240/12; B60L 2240/421; B60L 2240/423; B60L 2240/441; B60L 2240/443; B60L 2240/465; B60L 2240/647; B60L 2240/80; B60L 2250/24; B60L 2250/26; F02D 29/06; F02D 31/001; F02D 41/107; F02D 41/0225; F02D 41/021; F02D 41/08; F02D 2200/602; Y02T 10/6217; Y02T 10/645; Y02T 10/7077; Y02T 10/7241; Y02T 10/7275; Y02T 90/16; Y02T 10/7291; Y10S 903/93

See application file for complete search history.

(56) References Cited

U.S. PATENT DOCUMENTS

| | | | | |
|---|---|---|---|---|
| 2001/0020789 | A1* | 9/2001 | Nakashima | B60K 6/365 290/40 C |
| 2004/0040375 | A1* | 3/2004 | Kadota | B60K 6/00 73/115.02 |
| 2006/0089235 | A1* | 4/2006 | Kobayashi | B60K 6/48 477/107 |
| 2008/0224478 | A1* | 9/2008 | Tamor | B60W 10/06 290/40 C |
| 2009/0048064 | A1 | 2/2009 | Tanaka et al. | |
| 2009/0062063 | A1* | 3/2009 | Yamanaka | B60K 6/445 477/5 |
| 2009/0118078 | A1* | 5/2009 | Wilmanowicz | B60K 6/365 477/3 |
| 2012/0277944 | A1* | 11/2012 | Kaneko | B60K 6/442 701/22 |
| 2013/0166121 | A1* | 6/2013 | Takeuchi | B60K 6/445 701/22 |

FOREIGN PATENT DOCUMENTS

| | | |
|---|---|---|
| JP | 2000-008923 A | 1/2000 |
| JP | 2007-326408 A | 12/2007 |
| JP | 2007-326411 A | 12/2007 |
| JP | 2010-163946 A | 7/2010 |

OTHER PUBLICATIONS

International Preliminary Report on Patentability received in corresponding International Application No. PCT/JP2014/058136 dated Oct. 8, 2015.

International Search Report of PCT/JP2014/058136.

* cited by examiner

*Primary Examiner* — Jerrah Edwards
*Assistant Examiner* — Tamara Weber
(74) *Attorney, Agent, or Firm* — Mattingly & Malur, PC

(57) ABSTRACT

A vehicle status is judged with respect to whether the following conditions are met: the shift position of a shift lever 4 is F or R (condition 1); the brakes are inactive (condition 2); the vehicle stands still (condition 3); the accelerator pedal is depressed equal to or less than $\delta$ (condition 4); and the rotational speed of the engine is equal to or less than a medium rotational speed (condition 5). The engine is controlled such that the rotational speed is set to a minimum if conditions 1, 2, and 4 are met and condition 3 is not met or if condition 1 is met and condition 2 is not met; and the rotational speed is set to the medium rotational speed if conditions 1, 2, 3, and 5 are met or if conditions 1, 2, and 5 are met and conditions 3 and 4 are not met.

5 Claims, 7 Drawing Sheets

FIG. 6
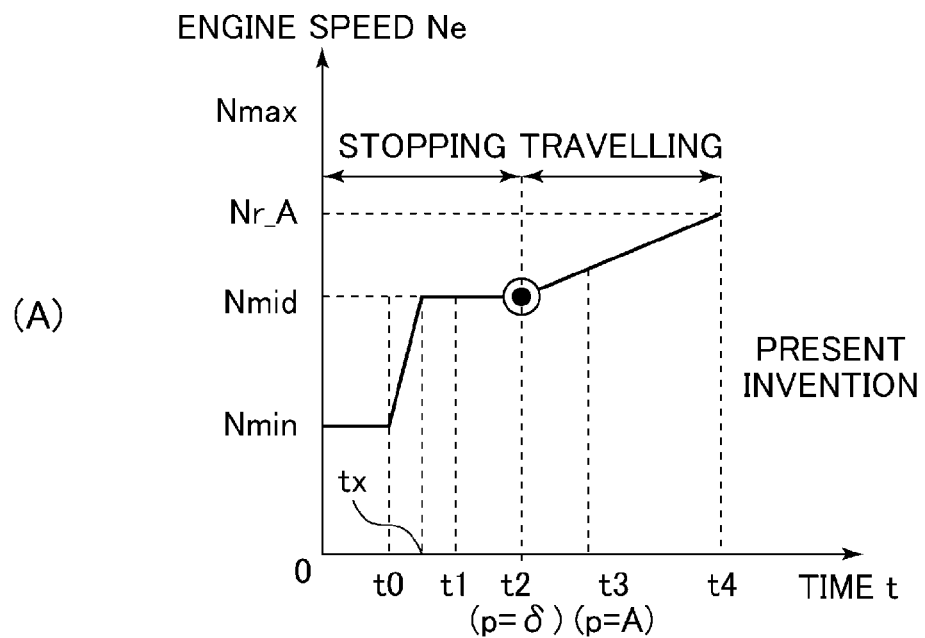
(A)
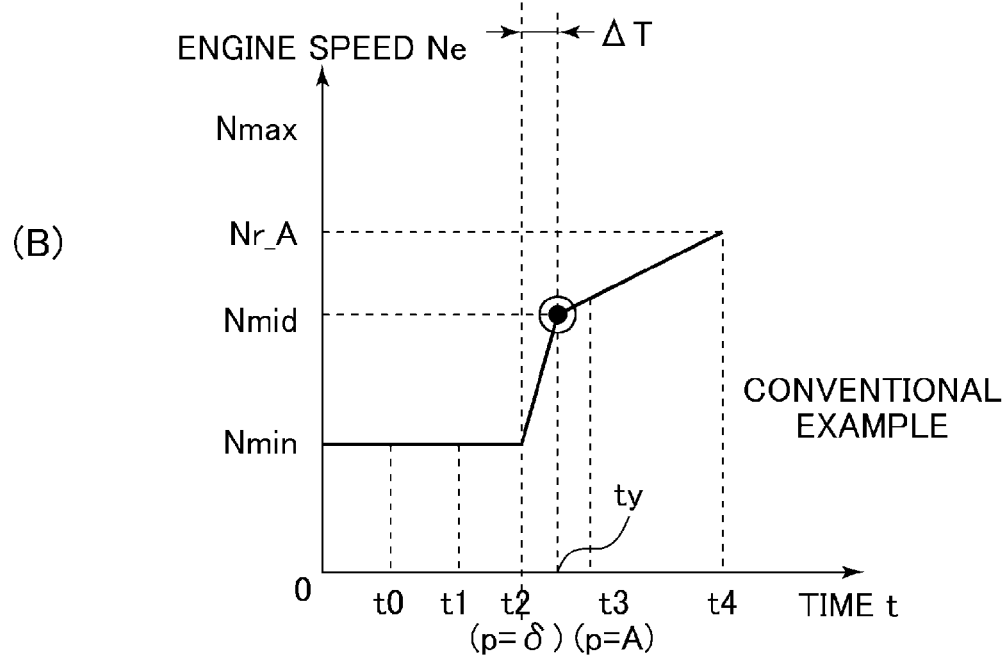
(B)

ENGINE ROTATION CONTROL SYSTEM

TECHNICAL FIELD

The present invention relates to an engine rotation control system used in an electrically driven dump truck.

BACKGROUND ART

Patent Document 1 below discloses a drive system for an electrically driven dump truck in which the engine rotational speed is set to a medium rotational speed when the shift lever is placed in the forward (F) position or the reverse (R) position (see claim 2). With this drive system, good responsiveness and acceleration can be obtained when the truck starts moving or when the driver depresses the accelerator pedal.

However, when the shift lever is placed in the forward (F) position or the reverse (R) position, the engine is always maintained at the speed equal or larger than the medium rotational speed. This means that the engine keeps rotating at the medium rotational speed even when a minimum rotational speed is enough, that is, when the truck is going down a hill, coasting, or decelerating, or when the truck stands still by the driver stepping on the brake pedal. In such cases, fuel is wasted, and the noise to the driver as well as to the outside is increased.

On the other hand, according to claim 3 of Patent Document 1, the engine speed is set to a minimum rotational speed when the depressed amount of the accelerator pedal is in the range of 0 to a predetermined small amount, thereby preventing the occurrence of such problems.

PRIOR ART DOCUMENTS

Patent Documents

Patent Document 1: Japanese Patent No. 4,230,494

SUMMARY OF THE INVENTION

Problem to be Solved by the Invention

According to claim 3 of Patent Document 1, however, when the driver steps on the accelerator to move the vehicle from halt status, torque control is performed on the electric motor after the engine speed has increased from the minimum rotational speed to the medium rotational speed. This will cause response lag which the driver may perceive as discomfort, and acceleration will also be affected.

An object of the invention is thus to provide an engine rotation control system that improves the response and acceleration of a vehicle when it starts moving after being stopped and is running and that minimizes the rotational speed of its engine when it does not need to be increased to achieve energy saving and less noise.

Means for Solving the Problem (1) To achieve the above object, the present invention provides an engine rotation control system comprising: a shift lever; a brake; an engine; a generator driven by the engine; one or more electric motors driven by electric power fed from the generator; an accelerator pedal; and a controller for controlling the rotational speed of the engine and the torque of the electric motor on the basis of the depressed amount of the accelerator pedal. The controller includes: a judging unit for determining whether conditions are respectively satisfied or not, the conditions including a first condition that the shift position of the shift lever is a forward position or a reverse position, a second condition that the brake is inactive, a third condition that a vehicle stands still, a fourth condition that the depressed amount of the accelerator pedal is equal to or less than a predetermined threshold 5, and a fifth condition that the rotational speed of the engine is equal to or less than a medium rotational speed higher than a minimum rotational speed and lower than a maximum rotational speed; and an engine rotation control unit for controlling the engine such that: the rotational speed of the engine becomes equal to the minimum rotational speed if the first, second, and fourth conditions are met and the third condition is not met; the rotational speed of the engine becomes equal to the minimum rotational speed if the first condition is met and the second condition is not met; the rotational speed of the engine becomes equal to the medium rotational speed if the first, second, third, and fifth conditions are met; and the rotational speed of the engine becomes equal to the medium rotational speed if the first, second, and fifth conditions are met and the third and fourth conditions are not met.

The above system (1) can improve the response and acceleration of the vehicle when it starts moving after being stopped and also when it is running. Further, when the vehicle is coasting, noise can be suppressed, and fuel consumption can be reduced.

(2) In the above system (1), preferably, the controller further includes an electric motor rotation control unit for controlling the electric motor. The engine rotation control unit controls the engine such that the rotational speed of the engine becomes equal to the rotational speed that corresponds to the depressed amount of the accelerator pedal if the fifth condition is not met, and the electric motor rotation control unit also controls the electric motor such that the torque of the electric motor becomes equal to the torque that corresponds to the rotational speed of the engine if the fifth condition is not met.

The above system (2) can improve the response and acceleration of the vehicle when it starts moving and is running.

(3) In the above system (1), preferably, the controller further includes an electric motor rotation control unit for controlling the electric motor. The engine rotation control unit controls the engine such that rotational speed of the engine becomes equal to the rotational speed that corresponds to the depressed amount of the accelerator pedal if the fifth condition is met and the fourth condition is not met, and the electric motor rotation control unit also controls the electric motor such that the torque of the electric motor becomes equal to the torque that corresponds to the rotational speed of the engine if the fifth condition is met and the fourth condition is not met.

The above system (3) can improve the response of the vehicle when it starts moving and is running.

(4) In the above system (1), preferably, the system further comprises a switch for switching to a first, second, or third mode. The engine rotation control unit controls the engine such that: the rotational speed of the engine becomes equal to the medium rotational speed if the first mode is selected and the first and fifth conditions are met; the rotational speed of the engine becomes equal to the medium rotational speed if the second mode is selected and the first, second, third, and fifth conditions are met; the rotational speed of the engine becomes equal to the medium rotational speed if the second mode is selected, the first, second, and fifth conditions are met, and the third and fourth conditions are not met; the rotational speed of the engine becomes equal to the minimum rotational speed if the third mode is selected and the first and fourth conditions are met; the rotational speed of the engine becomes equal to the minimum rotational speed if the second mode is selected, the first, second, and fourth conditions are met, and the third condition is not met; and the rotational speed of the engine becomes equal to the minimum rotational speed if the second mode is selected, the first condition is met, and the second condition is not met.

The above system (4) allows the optimal engine speed to be set according to the drive mode selected.

(5) In the above system (4), preferably, the controller further includes an electric motor rotation control unit for controlling the electric motor. The electric motor rotation control unit controls the electric motor such that the torque of the electric motor becomes equal to the torque that corresponds to the rotational speed of the engine after the rotational speed of the engine has become equal to the minimum rotational speed if the third mode is selected, the first condition is met, and the fourth condition is not met.

The above system (5) prevents the vehicle from going into a skid when it is running on a snowy, muddy, or slippery road.

Effect of the Invention

In accordance with the invention, the response and acceleration of the vehicle can be improved when it starts moving after being stopped and when it is running. Moreover, the rotational speed of the engine can be minimized when it does not need to be increased, thereby achieving energy saving and less noise. Other problems to be solved by the invention as well as other advantageous effects of the invention will be understood from the following disclosure of the invention.

BRIEF DESCRIPTION OF DRAWINGS

FIG. 6 is a graph illustrating the time series of the engine rotational speed controlled by the controller of the engine rotation control system.

MODE FOR CARRYING OUT THE INVENTION

Embodiment 1

Referring now to FIGS. 1 through 6, the structure and operation of an engine rotation control system according to Embodiment 1 of the invention will be described. The engine rotation control system is used in an electrically driven dump truck and designed to control the rotation of the engine that drives a generator.

Figure 1:
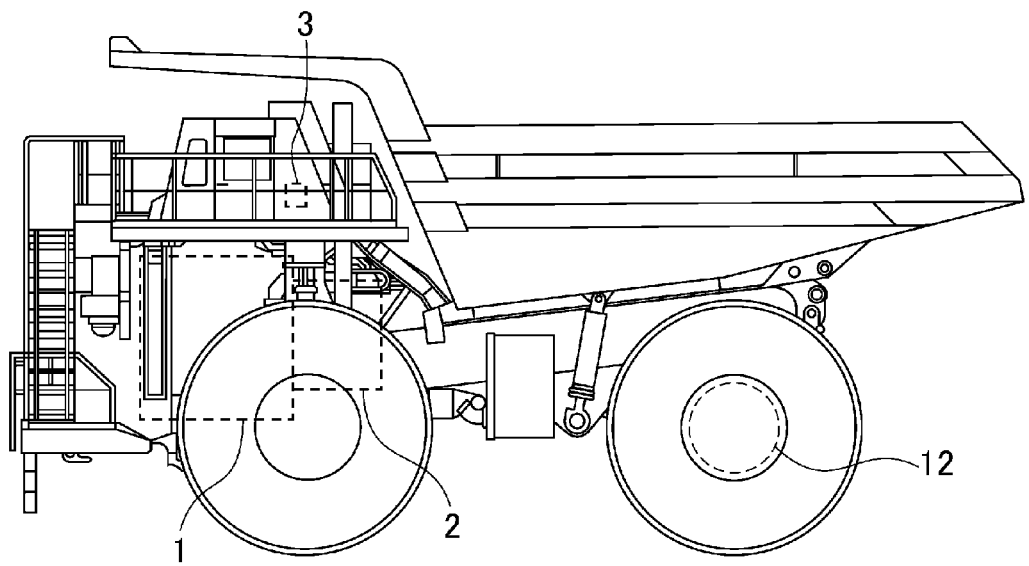
FIG. 1 illustrates the overall structure of an electrically driven dump truck incorporating an engine rotation control system according to Embodiment 1 of the invention.

First, the overall structure of the electrically driven dump truck is described with reference to FIG. 1. The figure illustrates the overall structure of an electrically driven dump truck that incorporates an engine rotation control system according to Embodiment 1 of the invention.

Main components of the electrically driven dump truck include an engine 1, a generator 2, a controller 3, and one or more electric motor 12.

The controller 3 controls the rotational speed of the engine 1 and the torque of the electric motor 12. The generator 2 is connected to the engine 1. Driven by the engine 1, the generator 2 generates electric power (alternating current). The power generated is first converted into a direct current, then back into an alternating current by an inverter (described later). The resultant alternating current is supplied to the electric motor 12, thereby driving it to move the dump truck forward or backward.

Figure 2:
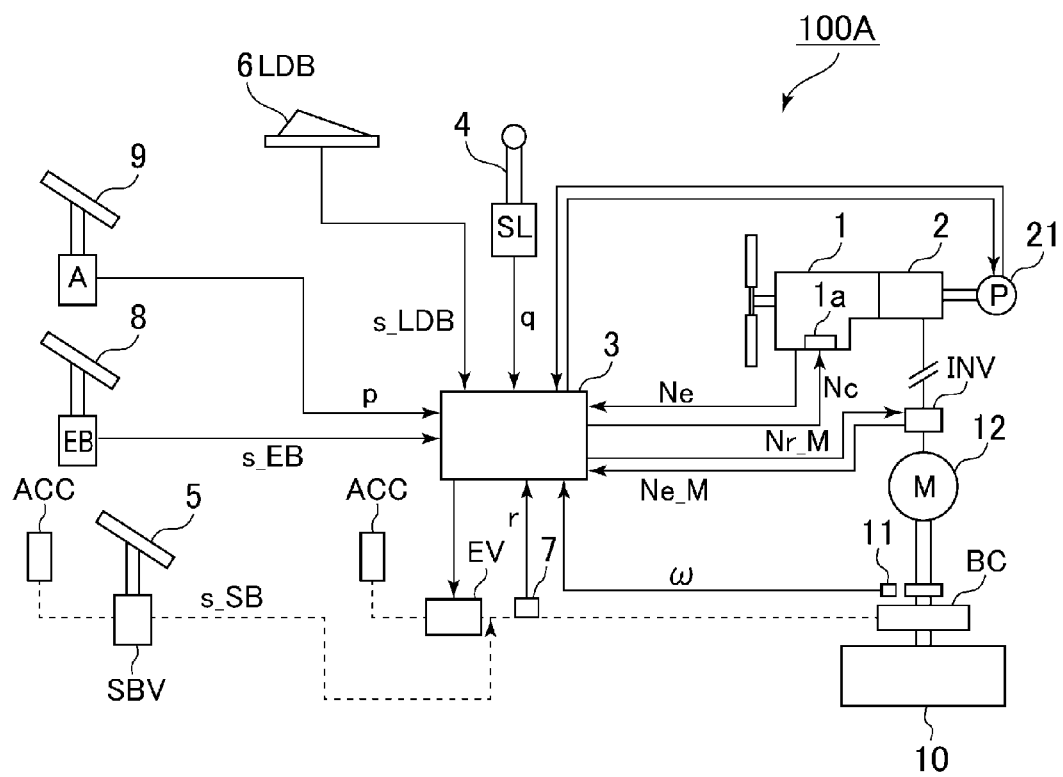
FIG. 2 illustrates the structure of the engine rotation control system.

Referring next to FIG. 2, the structure of an engine rotation control system used in the electrically driven dump truck is described in detail. FIG. 2 illustrates the structure of an engine rotation control system 100A according to Embodiment 1 of the invention. In the figure, the solid arrows represent the flows of electric signals while the dashed arrows represent the flows of hydraulic signals.

The engine rotation control system 100A includes the following components: the engine 1; the generator 2; the controller 3; a shift lever 4; a service brake pedal 5; a load/dump brake switch 6; rear-wheel hydraulic pressure sensors 7 (hereinafter referred to simply as the pressure sensors 7); an electric brake pedal 8; an accelerator pedal 9; tires 10; electromagnetic pickup sensors 11; the electric motor 12; an accumulator ACC; an electronic governor 1$a$; an inverter INV; and a hoist pump 21.

In response to a pedal depressing operation by the driver, the accelerator pedal 9 transmits to the controller 3 a signal indicative of its depressed amount p. On the basis of the depressed amount p of the accelerator pedal 9, the controller 3 controls the rotation of the engine 1.

In response to an operation by the driver, the shift lever 4 transmits to the controller 3 a signal indicative of its shift position q. The shift lever 4 can be placed in either of the following shift positions: forward (F), reverse (R), and neutral (N).

The electric brake pedal 8 is used to operate an electric brake, and this electric brake is used in normal driving. When the driver depresses the electric brake pedal 8, the electric motor 12 starts acting as a generator, thereby generating a braking force. However, when the vehicle speed becomes equal to a very low speed (about 0.5 km/h) or less, rear-wheel hydraulic brakes start to operate. The reason is that a sufficient braking force cannot be obtained by the electric brake alone when the vehicle runs at such a very low speed.

In response to a pedal depressing operation by the driver, the electric brake pedal 8 transmits to the controller 3 a signal indicative of its depressed amount s_EB. On the basis of the depressed amount s_EB of the electric brake pedal 8, the controller operates the electric brake.

The load/dump brake switch 6 is used to operate a load/dump brake. The load/dump brake is used when cargo is loaded onto or unloaded from the dump truck. When the load/dump brake switch 6 is turned on, the rear-wheel hydraulic brakes start to operate.

The load/dump brake switch 6 transmits to the controller 3 a signal s_LDB indicative of its on/off status. On the basis of the on/off status of the load/dump brake switch 6, the controller 3 operates a solenoid valve EV to activate or not to activate the rear-wheel hydraulic brakes BC.

The service brake pedal 5 is used to operate a service brake. The service brake is used to bring the vehicle to an emergency stop. Depressing the service brake pedal 5 causes front-wheel hydraulic brakes, the rear-wheel hydraulic brakes, and the electric brake to operate.

When the driver depresses the service brake pedal 5, a service brake valve SBV starts to operate, and in response to the pedal depressing operation, the service brake pedal 5 supplies the hydraulic force corresponding to the depressed amount s_SB of the service brake pedal 5 to the front-wheel and rear-wheel hydraulic brakes BC. The service brake pedal 5 is formed integrally with the service brake valve SBV. The accumulator ACC is connected to the service brake valve SBV and acts as a hydraulic source.

The pressure sensors 7 detect the brake pressures of the rear-wheels and transmit signals indicative of the detected pressures r to the controller 3.

The electromagnetic pickup sensors 11 transmit to the controller 3 signals indicative of the rotational speeds ω of the tires (wheels) 10. On the basis of the rotational speeds ω of the tires 10, the controller 3 determines if the vehicle is being stopped or not.

The electronic governor 1a controls fuel injection on the basis of an engine control signal Nc transmitted from the controller 3 so that the speed of the engine 1 becomes equal to the target rotational speed Nr that corresponds to the depressed amount p of the accelerator pedal.

The inverter INV controls the electric current applied to the electric motor 12 on the basis of an electric motor control signal Nr_M transmitted from the controller 3 so that the torque of the electric motor 12 becomes the torque that corresponds to the target rotational speed Nr of the engine 1. The inverter INV can instead control the electric current applied to the electric motor 12 such that the torque of the electric motor 12 becomes the torque that corresponds to the actual rotational speed Ne of the engine 1 or the depressed amount p of the accelerator pedal.

The hoist pump 21 is used to supply hydraulic fluid to the hoist cylinders that lift the vessel. This hoist pump 21 is controlled by the controller 3. The operating status of the hoist pump 21 is detected by a sensor installed on hoist pump 21, and a signal indicative of the status is transmitted to the controller 3.

Figure 3:
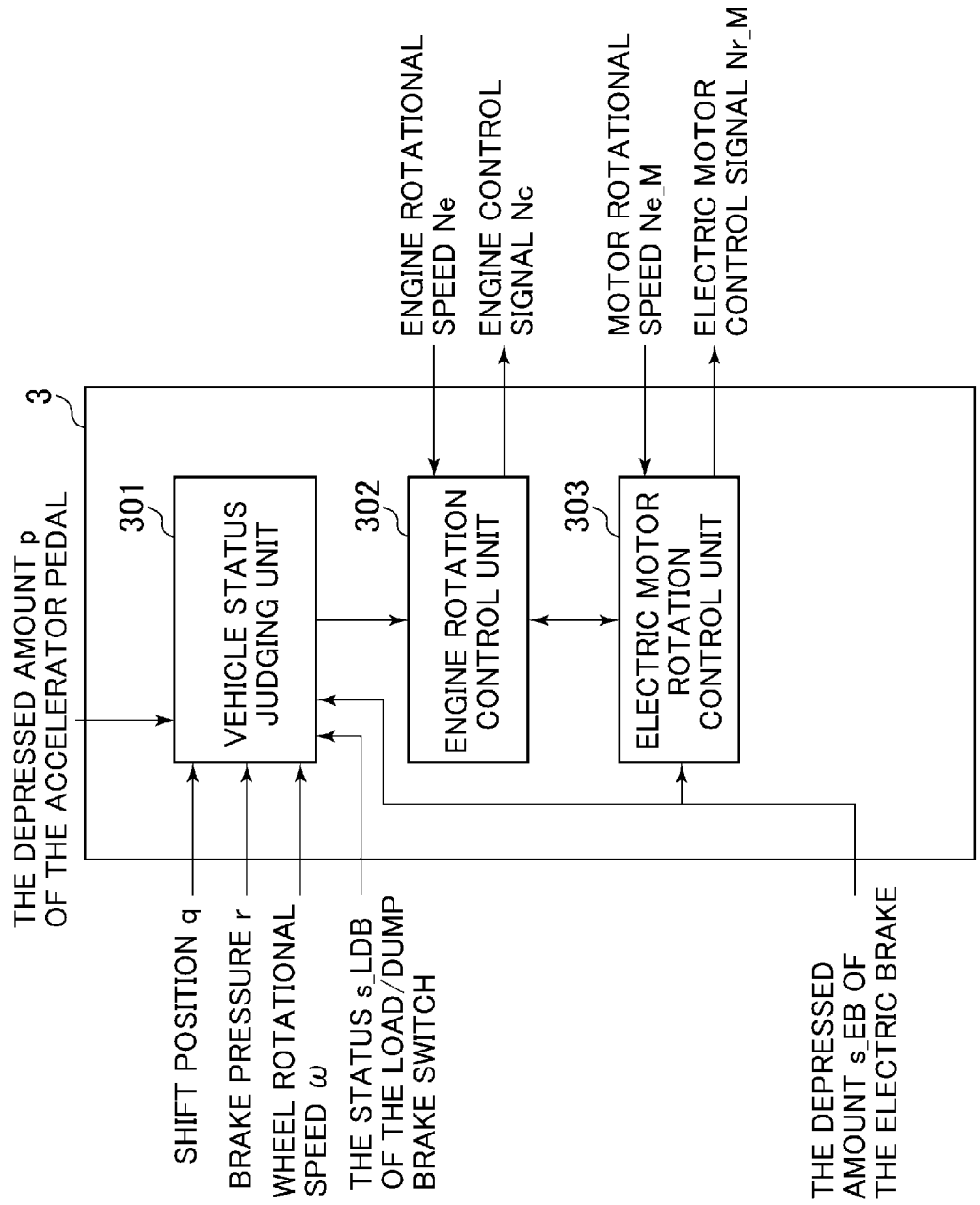
FIG. 3 illustrates the functionality of a controller used in the engine rotation control system.

The functionality of the controller 3 is described with reference to FIG. 3. FIG. 3 illustrates the functionality of the controller 3 used in the engine rotation control system 100A of Embodiment 1.

The controller 3 includes a vehicle status judging unit 301, an engine rotation control unit 302, and an electric motor rotation control unit 303.

On the basis of a shift position q transmitted from the shift lever 4, the vehicle status judging unit 301 determines whether the shift position of the shift lever 4 is in the forward (F) position or the reverse (R) position.

The vehicle status judging unit 301 also determines whether the service brake is active or not, on the basis of rear-wheel brake pressure signals r transmitted from the pressure sensors 7.

The vehicle status judging unit 301 further determines whether the load/dump brake is active or not, on the basis of a signal s_LDB transmitted from the load/dump brake switch 6.

Moreover, the vehicle status judging unit 301 calculates the vehicle speed on the basis of the wheel rotational speeds ω provided by the electromagnetic pickup sensors 11. On the basis of the calculated vehicle speed, the vehicle status judging unit 301 determines whether the vehicle stands still or not. Specifically, when the calculated vehicle speed is equal to or less than any value selected from the range of 0 to 0.5 km/h, the vehicle status judging unit 301 determines that the vehicle stands still or is not moving.

The vehicle status judging unit 301 also compares the depressed amount p of the accelerator pedal 9 against a predetermined small amount δ, on the basis of a signal indicative of the depressed amount p transmitted from the accelerator pedal 9. In the present embodiment, that predetermined small amount δ is selected from the 2-8% range of the largest depressed amount of the accelerator pedal 9.

Additionally, the vehicle status judging unit 301 determines whether the electric brake is active or not, on the basis of a signal from the electric brake 8 that indicates its depressed amount s_EB.

The engine rotation control unit 302 sets a target rotational speed Nr for the engine 1 on the basis of the judgement results obtained by the vehicle status judging unit 301. The engine rotation control unit 302 controls the engine 1 such that the engine rotational speed Ne fed back from the engine 1 becomes equal to the target rotational speed Nr. To perform the control, the engine rotation control unit 302 transmits an engine control signal Nc to the electronic governor 1a. On the basis of the engine control signal Nc, the electronic governor 1a controls the amount of fuel injected into the combustion chamber of the engine 1.

The electric motor rotation control unit 303 controls the electric motor 12 such that the torque of the electric motor 12 becomes the torque that corresponds to the target rotational speed Nr of the engine 1 set by the engine rotation control unit 302. Specifically, the electric motor rotation control unit 303 controls the electric motor 12 such that the torque of the electric motor 12 increases in proportion to a rise in the target rotational speed Nr of the engine 1. The electric motor rotation control unit 303 transmits to the inverter INV a motor control signal Nr_M including such a torque command. On the basis of the motor control signal Nr_M, the inverter INV controls the electric current applied to the electric motor 12. The actual rotational speed Ne_M of the electric motor 12 is fed back to the electric motor rotation control unit 303.

The electric motor rotation control unit 303 can instead control the electric motor 12 such that the torque of the electric motor 12 becomes the torque that corresponds to the actual rotational speed Ne of the engine 1 or the depressed amount p of the accelerator pedal.

On the basis of the depressed amount s_EB of the electric brake pedal 8, the electric motor rotation control unit 303 transmits to the inverter INV an electric motor control signal Nr_M including a command causing the electric motor 12 to function as a generator. The power generated by the electric motor 12 is converted into heat with the use of a grid resistor, for example, and the heat is discharged into the atmosphere.

Figure 4:
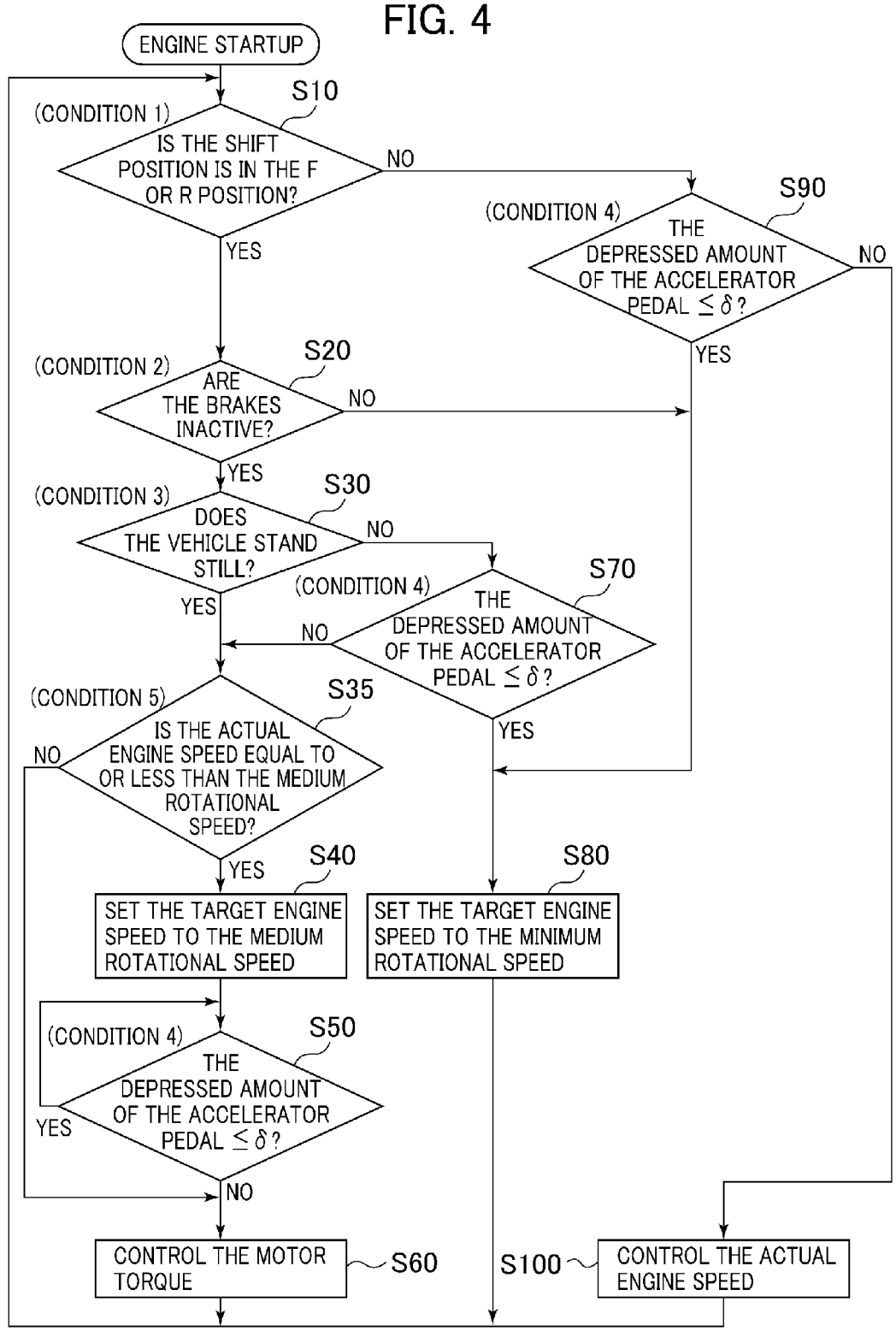
FIG. 4 is a flowchart illustrating the operation of the controller used in the engine rotation control system.

The operation of the controller 3 used in the engine rotation control system 100A is described next with reference to FIG. 4. FIG. 4 is a flowchart illustrating the control performed by the controller 3 used in the engine rotation control system 100A of Embodiment 1.

(1) When the Vehicle Starts Moving

First described is the operation of the controller 3 (the vehicle status judging unit 301, the engine rotation control unit 302, and the electric motor rotation control unit 303)

when the vehicle starts moving. In this case, the shift position q is the forward (F) position, all the brakes are not active, and the vehicle stands still. Further, the depressed amount p of the accelerator pedal is larger than the small amount δ, and the actual engine speed Ne is a minimum speed (idle speed).

After the startup of the engine 1, the vehicle status judging unit 301 determines in Step S10 whether the shift position q of the shift lever 4 is the forward (F) position or the reverse (R) position. In this example, since the shift position q is the forward position (F), the answer to Step S10 is yes, and the process proceeds to Step S20.

In Step S20, the vehicle status judging unit 301 determines whether any of the service brake, the load/dump brake, and the electric brake is inactive or not. Since no brakes are active in this case, the answer to Step S20 is yes, and the process proceeds to Step S30.

In Step S30, the vehicle status judging unit 301 determines whether the vehicle stands still or not. In this example, since the vehicle is not moving, the answer to Step S30 is yes, and the process proceeds to Step S35.

In Step S35, the vehicle status judging unit 301 determines whether the actual rotational speed Ne of the engine 1 is equal to or less than a medium rotational speed. In this example, since the actual rotational speed Ne is the minimum speed at first, the answer to Step S35 is yes, and the process proceeds to Step S40.

In Step S40, the engine rotation control unit 302 sets the target rotational speed Nr of the engine 1 to the medium rotational speed. In the present embodiment, the medium rotational speed is a value selected from the range of 900 to 1600 rpm. In other words, the medium rotational speed is higher than the minimum rotational speed of the engine 1 but lower than its maximum rotational speed.

In Step S50, the vehicle status judging unit 301 determines whether the depressed amount p of the accelerator pedal 9 is equal to or less than the small amount δ. If so (yes to Step S50), the vehicle status judging unit 301 repeats Step S50.

If not (no to Step S50), the engine rotation control unit 302 controls the engine 1 in Step S60 such that the rotational speed of the engine 1 becomes the rotational speed that corresponds to the depressed amount p of the accelerator pedal 9. In Step S60, the electric motor rotation control unit 303 also controls the electric motor 12 such that the torque of the electric motor 12 becomes the torque that corresponds to the rotational speed of the engine 1. The above process flow improves the response and acceleration of the vehicle when it starts moving and is running. The process then returns to Step S10.

(2) When the Vehicle Coasts

Next described is the operation of the controller 3 (the vehicle status judging unit 301 and the engine rotation control unit 302) when the vehicle coasts. In this case, the shift position q is the forward (F) position, all the brakes are not active, and the vehicle does not stand still. Further, the depressed amount p of the accelerator pedal is less than the small amount δ. The reason the small amount δ is set for the accelerator pedal 9 is that the driver may always put his foot on the accelerator pedal 9 except when he needs to depress the brake pedal.

In this example, the answers to Steps S10, 20, and 30 are yes, yes, and no, respectively since the shift position q is the forward (F) position, all the brakes are not active, and the vehicle does not stand still.

In Step S70, the vehicle status judging unit 301 determines whether the depressed amount p of the accelerator pedal 9 is equal to or less than the small amount δ. Since the depressed amount p of the accelerator pedal is less than the small amount δ in this example, the answer to Step S70 is yes.

In Step S80, the engine rotation control unit 302 sets the target rotational speed Nr of the engine 1 to a minimum rotational speed. In the present embodiment, the minimum rotational speed (idle speed) is a value selected from the range of 600 to 800 rpm. Once the target rotational speed Nr is set to the minimum rotational speed, the rotational speed Ne of the engine 1 soon becomes equal to the minimum rotational speed. This results in less fuel consumption and less noise. The process then returns to Step S10.

(3) When the Vehicle Decelerates

Next described is the operation of the controller 3 (the vehicle status judging unit 301 and the engine rotation control unit 302) when the vehicle decelerates. In this case, the shift position q is the forward (F) position, the electric brake is active, and the vehicle does not stand still. Further, the depressed amount p of the accelerator pedal is zero.

In this example, the answers to Steps S10 and 20 are yes and no, respectively since the shift position q is the forward (F) position and the electric brake is active.

In Step S80, the engine rotation control unit 302 sets the target rotational speed Nr of the engine 1 to the minimum rotational speed. Once the target rotational speed Nr is set to the minimum rotational speed, the rotational speed Ne of the engine 1 soon becomes equal to the minimum rotational speed. This results in less fuel consumption and less noise. The process then returns to Step S10.

(4) When the Vehicle Goes Down a Hill

Downhill traveling is a combination of coasting and deceleration. In this case, the rotational speed Ne of the engine 1 becomes the minimum rotational speed as already explained in (2) and (3). This results in less fuel consumption and less noise.

(5) When the Driver Depresses the Accelerator Pedal while the Vehicle is Moving

In this case, the shift position q is the forward (F) position, all the brakes are not active, and the vehicle does not stand still. Further, the depressed amount p of the accelerator pedal is larger than the small amount δ.

In this example, the answers to Steps S10, 20, and 30 are yes, yes, and no, respectively since the shift position q is the forward (F) position, all the brakes are not active, and the vehicle does not stand still. Further, the answer to Step S70 is no since the depressed amount p of the accelerator pedal 9 is larger than the small amount δ.

In Step S35, the vehicle status judging unit 301 determines whether the actual rotational speed Ne of the engine 1 is equal to or less than the medium rotational speed.

If so (yes to Step S35), the target rotational speed Nr of the engine 1 is set to the medium rotational speed in Step S40. The answer to the next step, S50, is yes since the depressed amount p of the accelerator pedal 9 is larger than the small amount 5, and torque control is performed on the electric motor 12 in Step S60. On the other hand, when the vehicle status judging unit 301 determines that the actual rotational speed Ne of the engine 1 is larger than the medium rotational speed (no to Step S35), torque control is performed on the electric motor 12 in Step S60.

In other words, if the depressed amount p of the accelerator pedal 9 exceeds the small amount δ while the vehicle is moving, the engine speed is first set to the medium rotation speed, followed by the torque control of the electric motor 12. This improves the response and acceleration of the vehicle when it is running. The process then returns to Step S10.

The answer to Step S35 can be yes, for example, before the actual rotational speed of the engine 1 reaches the medium rotational speed set in Step S40 or when the actual rotational speed Ne of the engine 1 is set to the minimum rotational speed due to coasting.

(6) When the Vessel is Lifted

When the vessel is lifted for soil dumping, the driver steps on the accelerator pedal to increase the rotational speed of the engine. This is because the rotational speed of the hoist pump 21, which is directly connected to engine 1, needs to be increased so that the pressure of the hydraulic fluid supplied to the hoist cylinders can be increased. When the vessel is lifted, the shift position of the shift lever 4 is the neutral (N) position.

After the startup of the engine 1, the vehicle status judging unit 301 determines in Step S10 whether the shift position q of the shift lever 4 is the forward (F) position or the reverse (R) position. Since the shift position q of the shift lever 4 is the neutral (N) position in this case, the answer to Step S10 is no, and the process proceeds to Step S90.

In Step S90, the vehicle status judging unit 301 determines whether the depressed amount p of the accelerator pedal 9 is equal to or less than the small amount δ.

If so (yes to Step S90), the engine rotation control unit 302 sets the target rotational speed Nr of the engine 1 to the minimum rotational speed in Step S80. This results in less fuel consumption and less noise.

On the other hand, when the vehicle status judging unit 301 determines that the depressed amount p of the accelerator pedal 9 is larger than the small amount δ (no to Step S90), the engine rotation control unit 302 controls the engine 1 in Step S100 such that the speed of the engine 1 becomes the rotational speed that corresponds to the depressed amount p of the accelerator pedal 9. Specifically, the engine rotation control unit 302 controls the engine 1 such that the actual rotational speed Ne of the engine 1 increases in proportion to a rise in the depressed amount p of the accelerator pedal 9. The process then returns to Step S10.

Figure 5A:
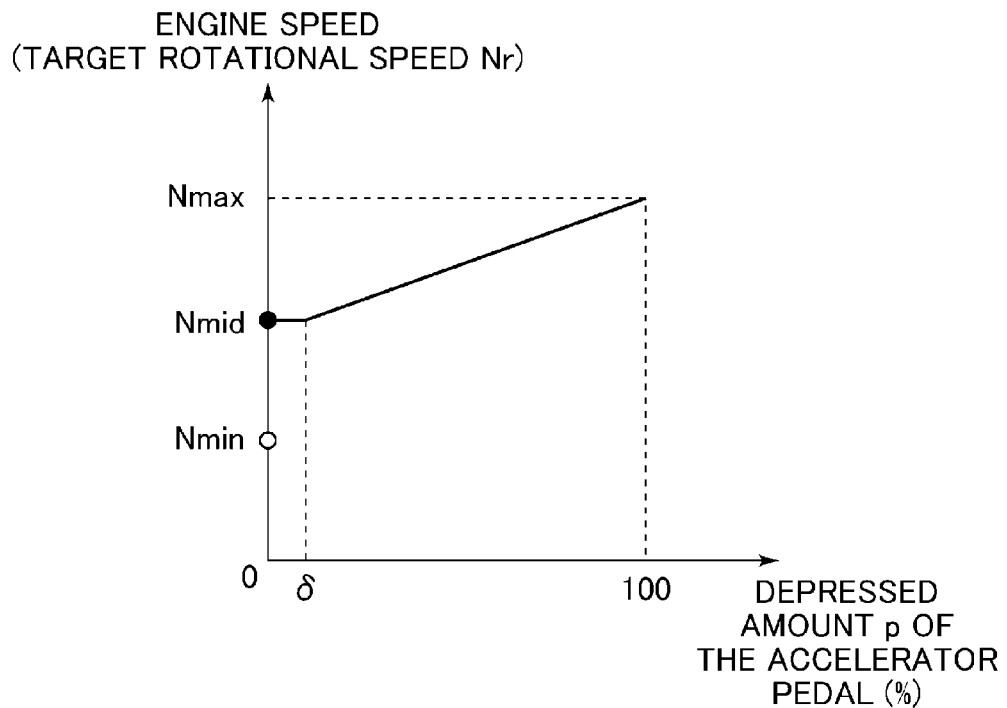
FIG. 5A is a graph illustrating the relation between the engine rotational speed controlled by the controller of the engine rotation control system and the depressed amount of an accelerator pedal when the truck stands still.
Figure 5B:
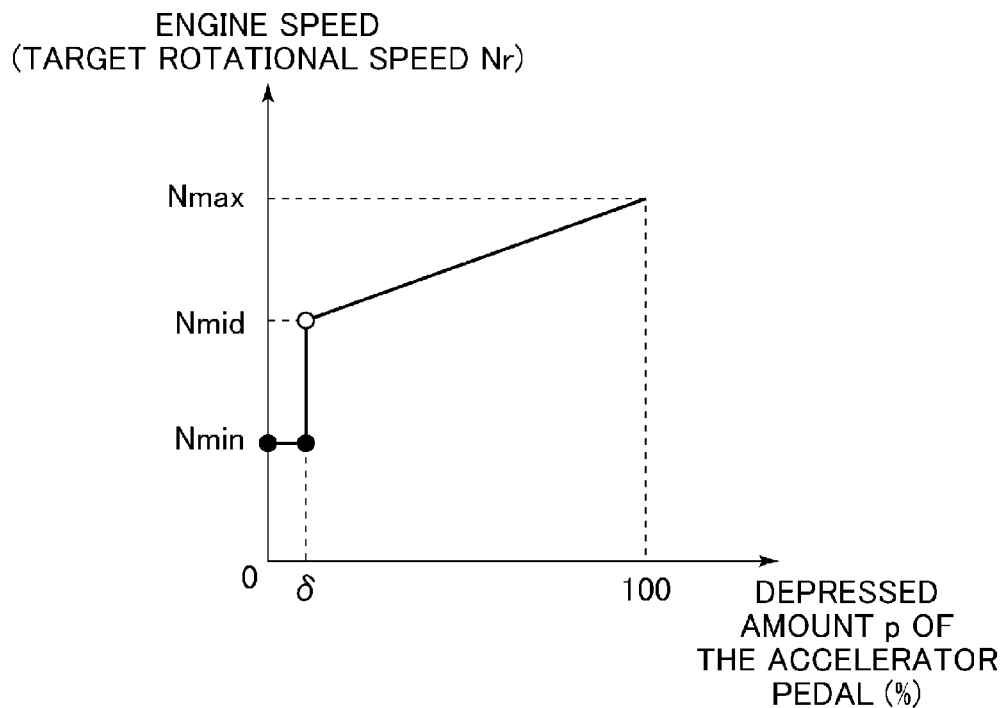
FIG. 5B is a graph illustrating the relation between the engine rotational speed controlled by the controller of the engine rotation control system and the depressed amount of the accelerator pedal when the truck is running.

Described next with reference to FIGS. 5A and 5B is the relation between the engine speed (the target rotational speed Nr) and the depressed amount p of the accelerator pedal 9. FIGS. 5A an 5B are graphs illustrating the relation between the rotational speed (target rotational speed Nr) of the engine 1 controlled by the engine rotation control system 100A of Embodiment 1 and the depressed amount p of the accelerator pedal 9.

FIG. 5A is obtained when the shift position q of the shift lever 4 is the forward (F) position or the reverse (R) position, the brakes are not active, and the vehicle stands still. In FIG. 5A, the vertical axis represents the target rotational speed Nr (rpm) while the horizontal axis represents the depressed amount p (%) of the accelerator pedal 9. The depressed amount p is expressed in percentage relative to the largest depressed amount of the accelerator pedal 9. When $0 \leq p \leq \delta$, the target rotational speed Nr becomes a medium rotational speed Nmid. The reason is that, in FIG. 4, the answers to Steps S10, S20, S30, and S35 are yes, yes, yes, and yes, respectively, and the target rotational speed Nr is set to the medium rotational speed Nmid in Step S40. In FIG. 5A, if $p > \delta$, the target rotational speed Nr increases in proportion to a rise in the depressed amount p of the accelerator pedal 9.

FIG. 5B is obtained when the shift position q of the shift lever 4 is the forward (F) position or the reverse (R) position, the brakes are not active, and the vehicle does not stand still.

In FIG. 5B, the vertical axis represents the target rotational speed Nr (rpm) while the horizontal axis represents the depressed amount p (%) of the accelerator pedal 9. FIG. 5B differs from FIG. 5A in that in the former, the vehicle does not stand still or is moving.

As illustrated in FIG. 5B, when $0 \leq p \leq \delta$, the target rotational speed Nr becomes a minimum rotational speed Nmin. The reason is that, in FIG. 4, the answers to Steps S10, S20, S30, and S70 are yes, yes, no, and yes, respectively, and the target rotational speed Nr is set to the minimum rotational speed Nmin in Step S80. If $p > \delta$, the target rotational speed Nr increases in proportion to a rise in the depressed amount p of the accelerator pedal 9. When p=100, the target rotational speed Nr is equal to the maximum rotational speed Nmax.

Described next with reference to FIG. 6 is the time series of the rotational speed Ne of the engine 1. FIG. 6 is a graph illustrating the time series of the rotational speed Ne of the engine 1 controlled by the controller 3 of the engine rotation control system 100A of Embodiment 1.

FIG. 6(A) illustrates the change of the rotational speed Ne during the time period from when the vehicle is being stopped by the driver stepping on the electric brake pedal 8 to when the rotational speed Ne reaches a target rotational speed by the driver stepping on the accelerator pedal 9. In FIG. 6(A), the vertical axis represents the rotational speed Ne of the engine 1 while the horizontal axis represents time t.

The following explanation is based on the assumptions that the shift position q of the shift lever 4 is the forward (F) position and that the driver first depresses the electric brake pedal 8 and then the accelerator pedal 9.

When $0 \leq t < t0$, the electric brake pedal 8 is being depressed. At t0, the driver puts his foot off the electric brake pedal 8. When $0 \leq t < t0$, the shift position q of the shift lever 4 is the forward (F) position, the electric brake is active, and the vehicle stands still. Thus, the rotational speed Ne of the engine 1 is set to the minimum rotational speed Nmin. This results in less fuel consumption and less noise.

When $t0 \leq t < t1$, the driver puts his foot off the electric brake pedal 8 and is about to step on the accelerator pedal 9. At t1, the driver starts to depress the accelerator pedal 9. When $t0 \leq t < t1$, the shift position q of the shift lever 4 is the forward (F) position, the electric brake is not active, and the vehicle stands still. Thus, the target rotational speed Nr is set to the medium rotational speed Nmid. However, the actual rotational speed Ne of the engine 1 will not soon reach the medium rotational speed Nmid.

As illustrated in FIG. 6(A), when $t0 \leq t < tx$, the rotational speed Ne of the engine 1 increases with the passage of time t, and at tx, it reaches the medium rotational speed Nmid. When $tx \leq t < t1$, the rotational speed Ne stays at the medium rotational speed Nmid. When the depressed amount p of the accelerator pedal 9 reaches the small amount δ, the torque of the electric motor 12 starts to be controlled. In FIG. 6(A), the point at which the torque control of the electric motor 12 starts is circled.

When $t1 \leq t \leq t2$, the depressed amount p of the accelerator pedal 9 is less than the small amount δ although the driver is depressing the accelerator pedal 9. At t2, the depressed amount p of the accelerator pedal 9 reaches the small amount δ. When $t1 \leq t \leq t2$, the depressed amount p of the accelerator pedal 9 increases with the passage of time t. During this time period, the shift position q of the shift lever 4 is the forward (F) position, the electric brake is not active, and the vehicle stands still. Thus, the rotational speed Ne of the engine 1 is set to the medium rotational speed Nmid.

When t2<t<t3, the depressed amount p of the accelerator pedal 9 has not yet to reach an amount A desired by the driver although the accelerator pedal 9 is being depressed. At t3, the depressed amount of the accelerator pedal 9 reaches the amount A (A>δ). When t2<t<t3, the depressed amount p of the accelerator pedal 9 increases with the passage of time t, and the rotational speed Ne of the engine 1 is controlled such that it becomes the target rotational speed Nr that corresponds to the depressed amount p of the accelerator pedal 9. Thus, when t2<t<t3, the rotational speed Ne of the engine 1 increases with the passage of time t.

When t3≤t≤t4, the depressed amount p of the accelerator pedal 9 stays at the amount A (A>δ) although the accelerator pedal 9 is being depressed. At t4, the rotational speed Ne of the engine 1 reaches the target rotational speed Nr_A that corresponds to the depressed amount A of the accelerator pedal 9. When t3≤t≤t4, the rotational speed Ne of the engine 1 is controlled such that it becomes the target rotational speed Nr_A that corresponds to the depressed amount A of the accelerator pedal 9. Thus, when t3≤t≤t4, the rotational speed Ne of the engine 1 increases with the passage of time t, and at time t4, it becomes equal to the target rotational speed Nr_A.

FIG. 6(B) is a graph illustrating the time series of the rotational speed Ne of the engine 1 according to a conventional example (claim 3 of Patent Document 1). In FIG. 6(B), the vertical axis represents the rotational speed Ne of the engine 1 while the horizontal axis represents time t.

When 0≤t≤t2, the shift position q of the shift lever 4 is the forward (F) position, and the depressed mount p of the accelerator pedal 9 is equal to or less than the small amount δ. Thus, the rotational speed Ne of the engine 1 is set to the minimum rotational speed Nmin.

As illustrated in FIG. 6(B), the rotational speed Ne of the engine 1 reaches the medium rotational speed Nmid at time ty and the target rotational speed Nr_A at time t4. In the example of FIG. 6(B), the torque control of the electric motor starts to be performed at time ty when the rotational speed Ne of the engine 1 reaches the medium rotational speed Nmid.

The timing at which the torque control of the electric motor starts is earlier in FIG. 6(A) (present invention) than in FIG. 6(B) (conventional example) by ΔT=ty−t2. Thus, in the present embodiment of the invention, the response and acceleration of the vehicle are better.

As described above, Embodiment 1 of the invention can improve the response and acceleration of the vehicle when it starts moving after being stopped.

The use of the engine rotation control system 100A of Embodiment 1 can minimize the engine speed of the electrically driven dump truck when the vehicle is going down a hill, coasting, or decelerating, or when the accelerator pedal 9 need not be operated during travelling, or when the vehicle is being stopped by the driver operating any of the brakes with the shift lever 4 being placed in the forward (F) position or the reverse (R) position. Accordingly, in such cases, energy can be saved and less noise is produced, which in turn increases the life time of the engine. Further, in normal driving situations as well, the engine rotation control system 100A does not impair the response and acceleration of the vehicle when it starts moving.

Embodiment 2

Figure 7:
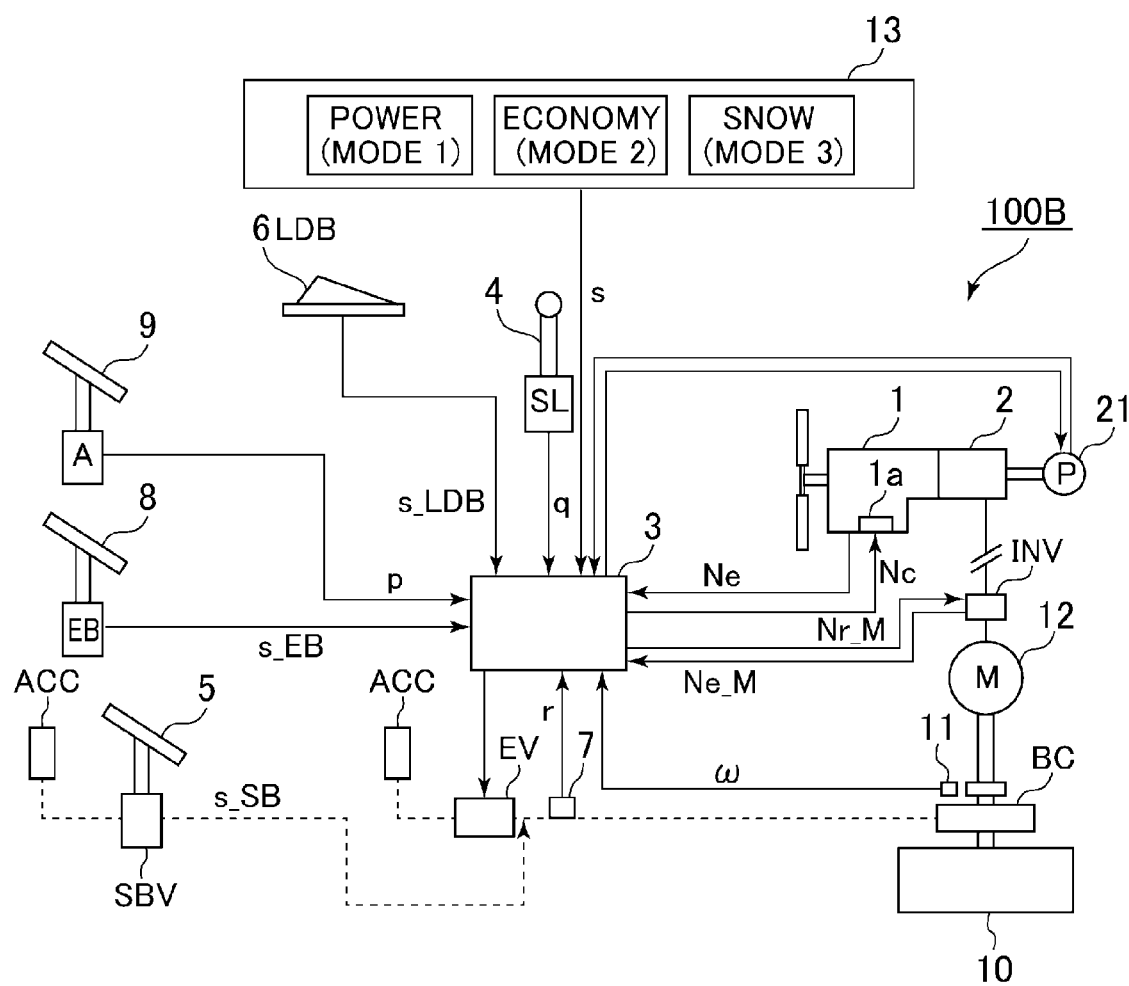
FIG. 7 illustrates the structure of an engine rotation control system according to Embodiment 2 of the invention.
Figure 8:
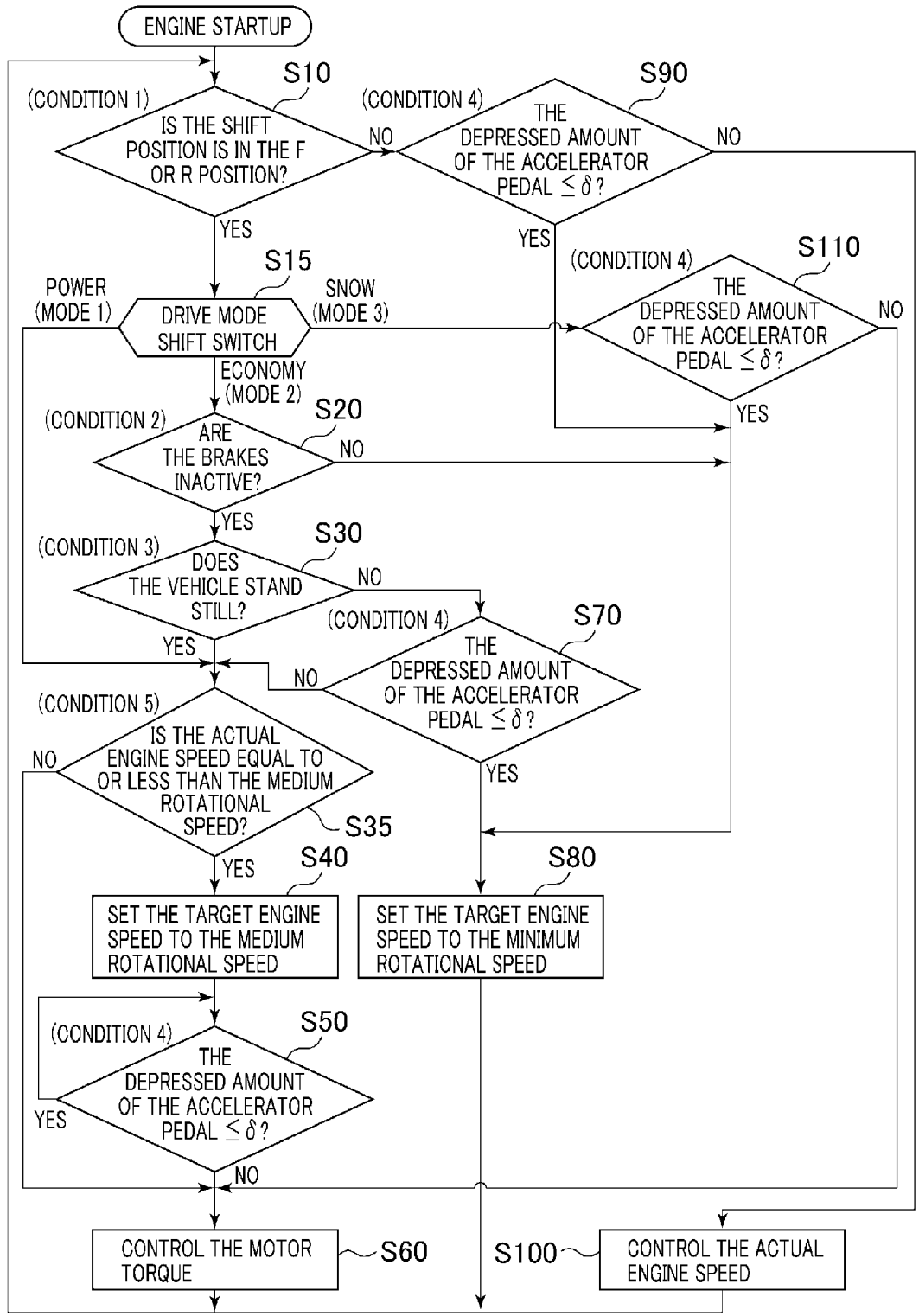
FIG. 8 is a flowchart illustrating the operation of a controller used in the engine rotation control system of Embodiment 2.

With reference now to FIGS. 7 and 8, the structure and operation of an engine rotation control system according to Embodiment 2 of the invention is described.

First described with reference to FIG. 7 is the structure of the engine rotation control system of Embodiment 2. FIG. 7 illustrates an engine rotation control system 100B according to Embodiment 2 of the invention. In FIG. 7, the same reference numerals as those used in FIG. 2 denote the same components.

The engine rotation control system 100B of FIG. 7 is obtained by adding a drive mode shift switch 13 (three-position shift switch) to the engine rotation control system 100A of FIG. 2.

The drive mode shift switch 13 is used to change drive modes. In response to an operation by the driver, the drive mode shift switch 13 transmits a signal indicative of the drive mode s to the controller 3. The drive mode shift switch 13 is placed at an easily accessible position such as on the front panel or on top of the right console inside the cab. Using the drive mode shift switch 13, the driver can select any of the following modes: mode 1 in which the engine 1 is controlled at from a medium rotational speed; mode 2 in which the same engine control as the control of Embodiment 1 is performed; and mode 3 in which the engine 1 is controlled at from a minimum speed regardless of the operation of the brakes and accelerator with the shift lever 4 being placed in the forward (F) position or the reverse (R) position. In the present embodiment, modes 1, 2, and 3 are called power mode, economy mode, and snow mode, respectively. The mode names should be simple enough so that the driver can intuitively understand them when selecting a mode.

Next described with reference to FIG. 8 is the operation of the controller 3 used in the engine rotation control system 100B of Embodiment 2. FIG. 8 is a flowchart illustrating the operation of the controller 3 used in the engine rotation control system 100B of Embodiment 2. In FIG. 8, the same reference numerals as those used in FIG. 4 denote the same steps.

FIG. 8 is obtained by adding Steps S15 and S110 to the flowchart of FIG. 4.

In Step S15, the vehicle status judging unit 301 determines which mode (power mode, economy mode, or snow mode) is requested by a signal indicative of drive mode s transmitted from the drive mode shift switch 13.

When the vehicle status judging unit 301 determines that the requested drive mode s is the power mode in Step S15, the process proceeds to Step S35. Similar to Embodiment 1, Steps S35 through S60 are then performed, and the process returns to Step S10 after Step S60.

When the vehicle status judging unit 301 instead determines that the requested drive mode s is the economy mode in Step S15, Step S20 and the subsequent steps are performed as in Embodiment 1, and the process then returns to Step S10.

If the vehicle status judging unit 301 determines that requested drive mode s is the snow mode in Step S15, then, the process proceeds to Step S110.

In Step S110, the vehicle status judging unit 301 determines whether the depressed amount p of the accelerator pedal 9 is equal to or less than the small amount δ.

If so (yes to Step S110), the engine rotation control unit 302 sets the target rotational speed Nr of the engine 1 to the minimum rotational speed in Step S80.

On the other hand, if the vehicle status judging unit 301 determines that the depressed amount p of the accelerator pedal 9 is larger than the small amount δ(no to Step S110), torque control is performed on the electric motor 12 in Step S60. That is, the electric motor rotation control unit 303 controls the electric motor 12 such that the torque of the electric motor 12 becomes the torque that corresponds to the rotational speed of the engine 1 after the engine rotational speed has become equal to the minimum rotational speed. The process then returns to Step S10.

As described above, Embodiment 2 provides three drive modes suitable for various operating conditions of the electrically driven dump truck. For instance, when the vehicle starts moving on a slippery or snowy road, good responsiveness and acceleration may result in the vehicle going into a skid. In such a case, the snow mode can be selected to prevent the skid. Further, if the driver desires higher responsiveness and acceleration from the state in which the vehicle is running, the power mode can be selected.

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

DESCRIPTION OF REFERENCE CHARACTERS

1: Engine
2: Generator
3: Controller
4: Shift lever
5: Service brake pedal
6: Load/dump brake switch
7: Rear-wheel hydraulic pressure sensor (pressure sensor)
8: Electric brake pedal
9: Accelerator pedal
10: Tire
11: Electromagnetic pickup sensor
12: Electric motor
13: Three-position shift switch (drive mode shift switch)
1a: Electronic governor
INV: Inverter
21: Hoist pump

The invention claimed is:
1. An engine rotation control system comprising:
a shift lever;
a brake;
an engine;
a generator driven by the engine;
one or more electric motors driven by electric power fed from the generator;
an accelerator pedal; and
a controller for controlling the rotational speed of the engine and the torque of the electric motor on the basis of the depressed amount of the accelerator pedal,
wherein the controller includes:
a judging unit for determining whether conditions are respectively satisfied or not, the conditions including
a first condition that the shift position of the shift lever is a forward position or a reverse position,
a second condition that the brake is inactive,
a third condition that a vehicle stands still,
a fourth condition that the depressed amount of the accelerator pedal is equal to or less than a predetermined threshold δ, and
a fifth condition that the rotational speed of the engine is equal to or less than a medium rotational speed higher than a minimum rotational speed and lower than a maximum rotational speed; and
an engine rotation control unit for controlling the engine such that
the rotational speed of the engine becomes equal to the minimum rotational speed if the first, second, and fourth conditions are met and the third condition is not met,
the rotational speed of the engine becomes equal to the minimum rotational speed if the first condition is met and the second condition is not met,
the rotational speed of the engine becomes equal to the medium rotational speed if the first, second, third, and fifth conditions are met, and
the rotational speed of the engine becomes equal to the medium rotational speed if the first, second, and fifth conditions are met and the third and fourth conditions are not met.

2. The engine rotation control system of claim 1, wherein:
the controller further includes an electric motor rotation control unit for controlling the electric motor;
the engine rotation control unit controls the engine such that the rotational speed of the engine becomes equal to the rotational speed that corresponds to the depressed amount of the accelerator pedal if the fifth condition is not met; and
the electric motor rotation control unit also controls the electric motor such that the torque of the electric motor becomes equal to the torque that corresponds to the rotational speed of the engine if the fifth condition is not met.

3. The engine rotation control system of claim 1, wherein:
the controller further includes an electric motor rotation control unit for controlling the electric motor;
the engine rotation control unit controls the engine such that rotational speed of the engine becomes equal to the rotational speed that corresponds to the depressed amount of the accelerator pedal if the fifth condition is met and the fourth condition is not met; and
the electric motor rotation control unit also controls the electric motor such that the torque of the electric motor becomes equal to the torque that corresponds to the rotational speed of the engine if the fifth condition is met and the fourth condition is not met.

4. The engine rotation control system of claim 1, further comprising a switch for switching to a first, second, or third mode, wherein the engine rotation control unit controls the engine such that:
the rotational speed of the engine becomes equal to the medium rotational speed if the first mode is selected and the first and fifth conditions are met;
the rotational speed of the engine becomes equal to the medium rotational speed if the second mode is selected and the first, second, third, and fifth conditions are met;
the rotational speed of the engine becomes equal to the medium rotational speed if the second mode is selected, the first, second, and fifth conditions are met, and the third and fourth conditions are not met;
the rotational speed of the engine becomes equal to the minimum rotational speed if the third mode is selected and the first and fourth conditions are met;
the rotational speed of the engine becomes equal to the minimum rotational speed if the second mode is selected, the first, second, and fourth conditions are met, and the third condition is not met; and the rotational speed of the engine becomes equal to the minimum rotational speed if the second mode is selected, the first condition is met, and the second condition is not met.

5. The engine rotation control system of claim 4, wherein:

the controller further includes an electric motor rotation control unit for controlling the electric motor; and the electric motor rotation control unit controls the electric motor such that the torque of the electric motor becomes equal to the torque that corresponds to the rotational speed of the engine after the rotational speed of the engine has become equal to the minimum rotational speed if the third mode is selected, the first condition is met, and the fourth condition is not met.

* * * * *